(12) United States Patent
Suzuki et al.

(10) Patent No.: US 8,706,402 B2
(45) Date of Patent: Apr. 22, 2014

(54) VEHICLE CONTROL APPARATUS AND VEHICLE CONTROL METHOD

(75) Inventors: Takashi Suzuki, Susono (JP); Koji Nakai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 874 days.

(21) Appl. No.: 12/759,078

(22) Filed: Apr. 13, 2010

(65) Prior Publication Data

US 2010/0262317 A1  Oct. 14, 2010

(30) Foreign Application Priority Data

Apr. 13, 2009 (JP) ................................. 2009-097312

(51) Int. Cl.
  *G06F 7/00* (2006.01)
(52) U.S. Cl.
  USPC ........... 701/411; 701/400; 701/416; 701/439; 701/80; 701/41; 701/23; 701/245; 701/253
(58) Field of Classification Search
  USPC ............. 701/411, 400, 416, 439, 80, 41, 116, 701/23; 700/245, 253
  See application file for complete search history.

(56) References Cited

U.S. PATENT DOCUMENTS

| | | | | |
|---|---|---|---|---|
| 5,978,731 A | * | 11/1999 | Matsuda | 701/93 |
| 6,009,374 A | * | 12/1999 | Urahashi | 701/36 |
| 6,035,253 A | * | 3/2000 | Hayashi et al. | 701/428 |
| 6,067,497 A | * | 5/2000 | Sekine et al. | 701/93 |
| 6,125,324 A | * | 9/2000 | Matsuda et al. | 701/409 |
| 6,138,084 A | * | 10/2000 | Mine | 702/157 |
| 6,141,619 A | * | 10/2000 | Sekine | 701/93 |
| 6,170,600 B1 | * | 1/2001 | Shimizu | 180/446 |
| 6,188,316 B1 | * | 2/2001 | Matsuno et al. | 340/441 |
| 6,199,011 B1 | * | 3/2001 | Matsuda | 701/411 |
| 6,212,453 B1 | * | 4/2001 | Kawagoe et al. | 701/41 |
| 6,219,609 B1 | * | 4/2001 | Matsuno et al. | 701/72 |
| 6,392,535 B1 | * | 5/2002 | Matsuno et al. | 340/441 |
| 6,424,904 B1 | * | 7/2002 | Takahashi et al. | 701/70 |
| 6,947,838 B1 | * | 9/2005 | Krull et al. | 701/411 |
| 7,162,349 B2 | * | 1/2007 | Hijikata et al. | 701/70 |
| 7,427,254 B2 | * | 9/2008 | Iwatsuki et al. | 477/92 |

(Continued)

FOREIGN PATENT DOCUMENTS

| EP | 1435601 A2 * | 7/2004 |
|---|---|---|
| JP | 4-181481 | 6/1992 |

(Continued)

OTHER PUBLICATIONS

Takehiko Fujioka, et al., "Numerical Analysis of Minimum-Time Cornering", The fourth Report: Road Constraints Using Inequality Constraints on State Values, vol. 24, No. 3, Jul. 1993, pp. 106-111 (With English Abstract).

(Continued)

*Primary Examiner* — Thomas Black
*Assistant Examiner* — Sara Lewandroski
(74) *Attorney, Agent, or Firm* — Oblon, Spivak, McClelland, Maier & Neustadt, L.L.P.

(57) ABSTRACT

In a vehicle control, a future travel locus of a vehicle is computed by using an evaluation function, and travel road surface information regarding a travel road surface on which the vehicle travels is stored. According to the travel road surface information stored, a convergence criterion for the evaluation function is variably set.

16 Claims, 5 Drawing Sheets

(56) References Cited

U.S. PATENT DOCUMENTS

| | | | |
|---|---|---|---|
| 7,474,961 B2 * | 1/2009 | Ibrahim | 701/446 |
| 7,493,209 B1 * | 2/2009 | Altrichter et al. | 701/423 |
| 7,702,442 B2 * | 4/2010 | Takenaka | 701/48 |
| 7,751,973 B2 * | 7/2010 | Ibrahim | 701/412 |
| 7,957,877 B2 * | 6/2011 | Makiyama | 701/72 |
| 8,010,280 B2 * | 8/2011 | Sekine | 701/445 |
| 8,050,834 B2 * | 11/2011 | Kondou et al. | 701/65 |
| 8,306,732 B2 * | 11/2012 | Hoffmann | 701/408 |
| 2001/0047241 A1 * | 11/2001 | Khavakh et al. | 701/209 |
| 2004/0049339 A1 * | 3/2004 | Kober et al. | 701/209 |
| 2005/0187694 A1 * | 8/2005 | Shiiba et al. | 701/70 |
| 2009/0265072 A1 * | 10/2009 | Kondou et al. | 701/90 |
| 2009/0299573 A1 * | 12/2009 | Thrun et al. | 701/41 |
| 2009/0319126 A1 * | 12/2009 | Miyajima et al. | 701/41 |

FOREIGN PATENT DOCUMENTS

| | | | |
|---|---|---|---|
| JP | 10-302199 | | 11/1998 |
| JP | 2001-169307 | | 6/2001 |
| JP | 2001169307 | A * | 6/2001 |
| JP | 2006-154967 | | 6/2006 |
| JP | 2006154967 | A * | 6/2006 |
| JP | 2008-275621 | | 11/2008 |

OTHER PUBLICATIONS

Japanese Office Action issued Dec. 28, 2010, in Japan patent Application No. 2009-097312 (with English Translation).

* cited by examiner

VEHICLE CONTROL APPARATUS AND VEHICLE CONTROL METHOD

INCORPORATION BY REFERENCE

The disclosure of Japanese Patent Application No. 2009-097312 filed on Apr. 13, 2009 including the specification, drawings and abstract is incorporated herein by reference in its entirety.

BACKGROUND OF THE INVENTION

1. Field of the Invention

The invention relates to a vehicle control apparatus and a vehicle control method.

2. Description of the Related Art

There has been developed a method that, in order to drive through a corner in a shortest possible time, sets a time of passage through the corner as an evaluation function, and computes an ideal locus by using an optimization technique. For example, in "Numerical Analysis of Minimum-Time Cornering—The Fourth Report: Road Constraints Using Inequality Constraints on State Values—" by Takehiko Fujioka and Daisuke Emori, Transactions of Society of Automotive Engineers of Japan, Vol. 24, No. 3, July 1993, p.106-111, it is described that the Sequential Conjugate Gradient-Restoration Algorithm (SCGRA) that is used to compute an optimum locus of an artificial satellite, a space shuttle, etc., is applied to calculation of motion of a vehicle, and the time of passage through a corner is set as the evaluation function in order for the vehicle to pass through the corner in the shortest time.

Besides, Japanese Patent Application Publication No. 2008-275621 (JP-A-2008-275621) discloses a technology that determines a travel route by using an evaluation function. In the technology, using an evaluation function that represents a lower limit of the cost related to the route to a destination relative to a vertex, a value of an evaluation function based on a first graph is determined, and on the basis of the determined value of the evaluation function, a route from the departure point to the destination on a second graph is searched for.

Besides, Japanese Patent Application Publication No. 10-302199 (JP-A-10-302199) provides a disclosure related to a technology that performs an optimizing control of a lateral displacement on the basis of an evaluation function and constraint condition. The disclosure is that a steering actuator is controlled so that the lateral displacement detected by a magnetic sensor becomes equal to a targeted lateral displacement, whereby the sliding velocity of the vehicle in the lateral direction relative to the magnetic source at the position of the magnetic sensor is reduced.

However, in conjunction with the foregoing travel locus optimization technology, there is no disclosure as to the manner in which values for determining convergence, such as the equation of motion, a constraint condition, a boundary condition, etc., should be set. In the case where a travel plan of a motor vehicle or the like is to be calculated by using the optimization technique, it is difficult in the related technologies to appropriately set a condition for convergence determination while taking into account vehicle stability, computation time, etc.

That is, the calculation of a travel locus ends in the case where the evaluation function is determined as having converged. If, in a simulation, a condition for determining that the function has converged is set strict, the computation accuracy heightens but a long computation time is needed. On the other hand, if the constraint condition is set less strict, the calculation ends in an early period, but it becomes necessary to make a contrivance regarding the relaxation of the convergence condition in order to maintain vehicle stability in an actual travel.

SUMMARY OF THE INVENTION

The invention provides a vehicle control apparatus and a vehicle control method that are able to achieve both reduced computation time and good vehicle stability by appropriately setting conditions for determining convergence of an evaluation function.

A first aspect of the invention relates to a vehicle control apparatus. This vehicle control apparatus includes: a travel locus computation portion that computes a future travel locus of a vehicle by using an evaluation function; a travel road surface information storage portion that stores travel road surface information regarding a travel road surface on which the vehicle travels; and a convergence criterion setting portion that variably sets a convergence criterion for the evaluation function according to the travel road surface information stored in the travel road surface information storage portion.

A second aspect of the invention relates to a vehicle control method. This vehicle control method includes: computing a future travel locus of a vehicle by using an evaluation function; storing travel road surface information regarding a travel road surface on which the vehicle travels; and variably setting a convergence criterion for the evaluation function according to the travel road surface information stored.

In the vehicle control in accordance with the first and second aspects, the convergence criterion for the evaluation function is variably set according to the stored travel road surface information, and a future travel locus of the vehicle is computed by using the evaluation function so that the set convergence criterion is satisfied. Therefore, in the vehicle control, it is possible to appropriately set the condition for determining the convergence of the evaluation function, and therefore perform a computation of a travel locus which achieves both reduced computation time and good vehicle stability.

In the foregoing vehicle control apparatus, the travel road surface information may include at least one of road width information regarding a road width of the travel road surface, friction information regarding friction of the travel road surface, and curve information regarding curve of the travel road surface.

In this vehicle control apparatus, the travel road surface information includes at least one of road width information regarding the road width of the travel road surface, friction information regarding the friction of the travel road surface, and curve information regarding curve of the travel road surface. Due to this, the vehicle control apparatus is able to achieve both reduced computation time and good vehicle stability by appropriately setting the condition for determining the convergence of the evaluation function while taking into account states of the travel road surface, such as the road width, the friction, the curve, etc.

In the foregoing vehicle control apparatus, the travel road surface information may include the road width information, and the convergence criterion setting portion may set the convergence criterion greater, as the road width in the road width information becomes greater.

This vehicle control apparatus sets the convergence criterion greater, as the road width in the road width information becomes greater. Due to this, the vehicle control apparatus, if the road width is relatively great, performs a computation in which reduction of the computation time is regarded as more important than improvement of the computation accuracy, and, if the road width is relatively small, performs a computation in which improvement of the computation accuracy is regarded as more important than reduction of the computation time. Therefore, the apparatus is able to perform a computation of a travel locus which achieves both reduced computation time and good vehicle stability.

In the foregoing vehicle control apparatus, the travel road surface information may include the friction information, and the friction information may include a friction coefficient of the travel road surface, and the convergence criterion setting portion may set the convergence criterion greater, as the friction coefficient becomes greater.

In this vehicle control apparatus, the friction information includes the friction coefficient of the travel road surface, and the convergence criterion is set greater, as the friction coefficient in the friction information becomes greater. Due to this, the vehicle control apparatus, if the friction coefficient is relatively great, performs a computation in which reduction of the computation time is regarded as more important than improvement of the computation accuracy, and, if the friction coefficient is relatively small, performs a computation in which improvement of the computation accuracy is regarded as more important than reduction of the computation time. Therefore, the apparatus is able to perform a computation of a travel locus which achieves both reduced computation time and good vehicle stability.

In the vehicle control apparatus, the travel road surface information may include the curve information, and the curve information may include radius of the curve of the travel road surface, and the convergence criterion setting portion may set the convergence criterion greater, as the radius of the curve becomes greater.

In this vehicle control apparatus, the curve information includes the radius of the curve of the travel road surface, and the convergence criterion is set greater, as the radius of the curve in the curve information becomes greater. Due to this, the vehicle control apparatus, if the radius of curve is relatively great, performs a computation in which reduction of the computation time is regarded as more important than improvement of the computation accuracy, and, if the radius of curve is relatively small, performs a computation in which improvement of the computation accuracy is regarded as more important than reduction of the computation time. Therefore, the apparatus is able to perform a computation of a travel locus which achieves both reduced computation time and good vehicle stability.

In the foregoing vehicle control apparatus, the convergence criterion setting portion may compute an allowed calculation time that elapses before control of the vehicle starts, based on the travel road surface information stored in the travel road surface information storage portion, and may variably set the convergence criterion according to the allowed calculation time.

In this vehicle control apparatus, the allowed calculation time preceding the start of control of the vehicle is computed on the basis of the stored travel road surface information, and the convergence criterion is variably set according to the allowed calculation time. Due to this, the vehicle control apparatus is able to perform a computation of a travel locus in which vehicle stability is taken into account according to the allowed calculation time that is computed according to the travel road surface.

In the vehicle control apparatus, the convergence criterion setting portion may set the convergence criterion greater, as the allowed calculation time becomes longer.

In this vehicle control apparatus, the convergence criterion is set greater, as the allowed calculation time becomes longer. Due to this, the vehicle control apparatus, if the allowed calculation time is relatively long, performs a computation in which improvement of the computation accuracy is regarded as more important than reduction of the computation time, and, if the allowed calculation time is relatively short, performs a computation in which reduction of the computation time is regarded as more important than improvement of the computation accuracy. Therefore, the apparatus is able to perform a computation of a travel locus which achieves both reduced computation time and good vehicle stability.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, embodiments of the vehicle control apparatus and the vehicle control method in accordance with the invention as well as embodiments of programs in accordance with the vehicle control apparatus and the vehicle control method will be described with reference to the drawings. Incidentally, the following embodiments do not limit the invention.

1. Construction

Figure 1:
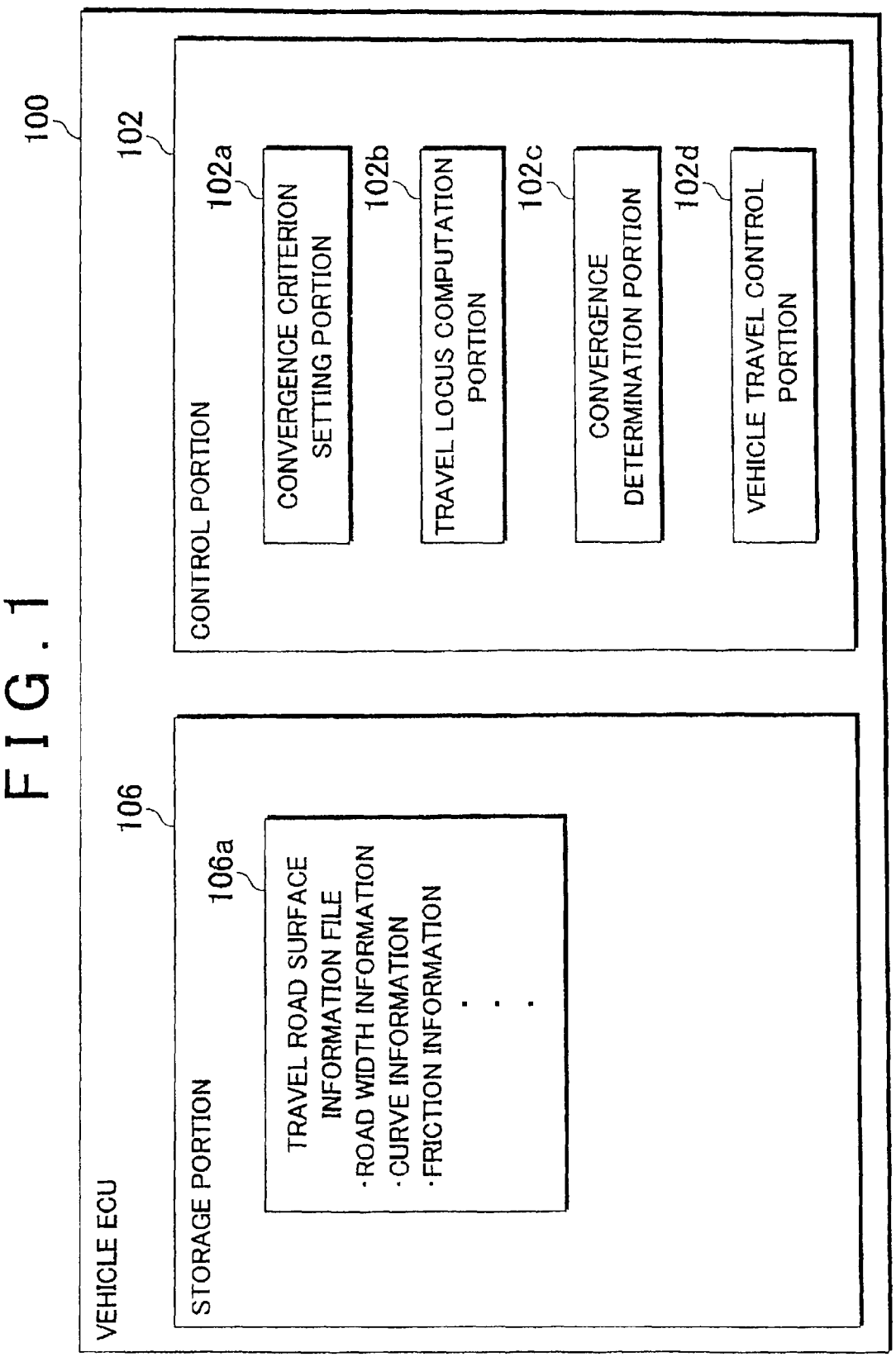
FIG. 1 is a block diagram showing an example of a construction of a system in accordance with an embodiment of the invention.

Firstly, a construction of a system of an embodiment that encompasses an electronic control unit for carrying out a travel locus generation method in accordance with the invention and a vehicle control apparatus in accordance with the invention (hereinafter, sometimes termed the system or this system) will be described with reference to FIG. 1.

This system is a system for computing a travel locus that a vehicle follows when traveling on a road by using an evaluation function that employs traveling time, vehicle stability, fuel economy, etc., as indexes, on the basis of an optimization technique, and for controlling the motion of the vehicle on the basis of the computed travel locus so that the vehicle realizes the travel locus. Incidentally, the "travel locus" in this embodiment is a concept that includes both the line along which the vehicle moves and the velocity of the vehicle on the line of movement, and particularly includes a longitudinal position (e.g., acceleration and deceleration) and a lateral position (e.g., offset from a white line (or a painted line) on the road) relative to the road, or latitude and longitude. This system is generally constructed by a vehicle ECU 100 as shown in FIG. 1.

The vehicle ECU 100 is an electronic control unit that generally includes control portion 102 and a storage portion 106. The control portion 102 and the storage portion 106 are connected via an arbitrary communication path so as to be able to communicate.

The storage portion 106 is an information storage portion that may be, for example, a memory device, such as a RAM, a ROM, etc., a fixed disk device, such as a hard disk, a flexible disk, an optical disk, etc. The storage portion 106 stores therein computer programs for giving commands to the CPU to perform various processes in cooperation with an OS (operating system). The storage portion 106 generally includes a travel road surface information file 106a.

The travel road surface information file 106a is a travel road surface information storage portion that stores travel road surface information regarding the travel road surface on which the vehicle travels. Examples of the travel road surface information are road width information regarding road width of the travel road surface, friction information regarding friction of the travel road surface, curve information regarding curve of the travel road surface, road information for computation of an allowed calculation time that precedes the start of the control of the vehicle performed by a vehicle travel control portion 102d (e.g., road section information that includes sectional distances along the road), etc. The road width information may include information regarding boundaries of the road, such as numerical values of the road width, the road shoulder width, the safety margin from the center line of the road, etc. Besides, the friction information may include the friction coefficient (μ) of the travel road surface and also information as to whether the travel road surface is wet or dry, etc. Incidentally, the friction information may also be constructed so as to be changed according to the weather information regarding the weather which has been acquired from an external device outside the vehicle. Besides, the curve information may include the radius of curve (R) of the curve of the travel road surface, the curvature of curve (1/R), information regarding whether the curve is sharp or gentle.

The control portion 102 is a CPU or the like that centrally controls the entire vehicle ECU 100. The control portion 102 has an internal memory for storing control programs, such as the OS (operating system) and the like, and programs that prescribe processing procedures and the like, as well as necessary data and the like. On the basis of these programs and the like, the control portion 102 executes various information processes. The control portion 102, in terms of the functional concept, includes a convergence criterion setting portion 102a, a travel locus computation portion 102b, a convergence determination portion 102c and a vehicle travel control portion 102d.

The convergence criterion setting portion 102a variably sets a convergence criterion (e.g., a convergence criterion value ε1) for the evaluation function according to the travel road surface information stored in the travel road surface information file 106a. That is, by setting the convergence criterion in accordance with the state of the travel road surface, the convergence criterion setting portion 102a determines the degree of priority to be given to the reduction of the time of computation of the travel locus, the degree of priority to be given to the improvement of the computation accuracy for the travel locus, etc. It is to be noted herein that the convergence criterion setting portion 102a may set the convergence criterion value ε1 greater the greater the actual road width Wr included in the road width information stored in the travel road surface information file 106a. Besides, the convergence criterion setting portion 102a may also set the convergence criterion value ε1 greater the greater the friction coefficient μ included in the friction information stored in the travel road surface information file 106a. Besides, the convergence criterion setting portion 102a may also set the convergence criterion value ε1 greater the greater the radius of curve R included in the curve information stored in the travel road surface information file 106a. Besides, the convergence criterion setting portion 102a may also compute an allowed calculation time $T_{calc}$ that elapses before the control of the vehicle is started, and may variably set the convergence criterion value ε1 according to the allowed calculation time $T_{calc}$, on the basis of the road info nation (travel road surface information, and the like) stored in the storage portion 106 such as the travel road surface information file 106a and the like. In this case, the convergence criterion setting portion 102a may set the convergence criterion value ε1 greater the longer the calculated allowed calculation time $T_{calc}$.

Besides, the convergence criterion setting portion 102a may also calculate a permissible error Err of the amount of protrusion of the vehicle relative to the road, and may set the convergence criterion value ε1 according to the calculated permissible error Err, according to the travel road surface information, such as the road width Wr, the radius of curve R, the friction coefficient μ, the allowed calculation time $T_{calc}$, etc., on the basis of the following function. Permissible error $Err=f(Wr, R, \mu, T_{calc})$ The travel locus computation portion 102b computes the future travel locus of the vehicle by using the evaluation function. More concretely, the travel locus computation portion 102b may compute an optimum travel locus by acquiring from the storage portion 106, such as the travel road surface information file 106a and the like, road information regarding the shape of a road section (linear line, curved line, width, etc. thereof), the section distance of a road section (length of a section), boundaries of the road (lanes and the like), etc., which are objects of the computation based on the optimization technique, and setting a constraint condition that constrains conditions for determining whether or not the vehicle has protruded from the road, or the like, an equation of motion, a control expression, etc., that define an initial end condition and a terminating end condition about the road, the initial solution of a travel locus, and a condition for determining whether or not a physical relation of the motion of the vehicle is satisfied, and generating a travel locus on the basis of the set conditions, the set expressions, etc., and repeatedly performing the generation of a travel locus by using the evaluation function. It is to be noted herein that the travel locus computation portion 102b may generate a travel locus by using an optimization technique such as a conjugate gradient method, a steepest-descent method, a Newton method, a quasi-Newton method, etc. Besides, the evaluation function may be set beforehand, and may also be set according to the purpose of the vehicle travel control by the vehicle travel control portion 102d (fuel economy being regarded as important, traveling time being regarded as important, etc.). The purpose of the travel control (fuel economy being regarded as important, traveling time being regarded as important, etc.) may be read from the driver's driving operation, and may be set so as to change momentarily. In this case, as a result, the evaluation function is appropriately set in accordance with the driver's driving operation. That is, the evaluation function may also be automatically switched in accordance with the driver's driving operation.

The convergence determination portion 102c determines whether or not the travel locus computed by the travel locus computation portion 102b meets the convergence criterion value $\epsilon 1$ for the evaluation function which is set by the convergence criterion setting portion 102a.

The vehicle travel control portion 102d controls the traveling of the vehicle on the basis of the travel locus which is calculated by the travel locus computation portion 102b and which has been determined as meeting the convergence criterion value $\epsilon 1$ by the convergence determination portion 102c.

2. Processing

Next, an example of the processing performed by this system constructed as described above will be described in detail with reference to FIG. 2 to FIG. 7.

The travel locus computing process in this system will be described in detail with reference to FIG. 2.

Figure 2:
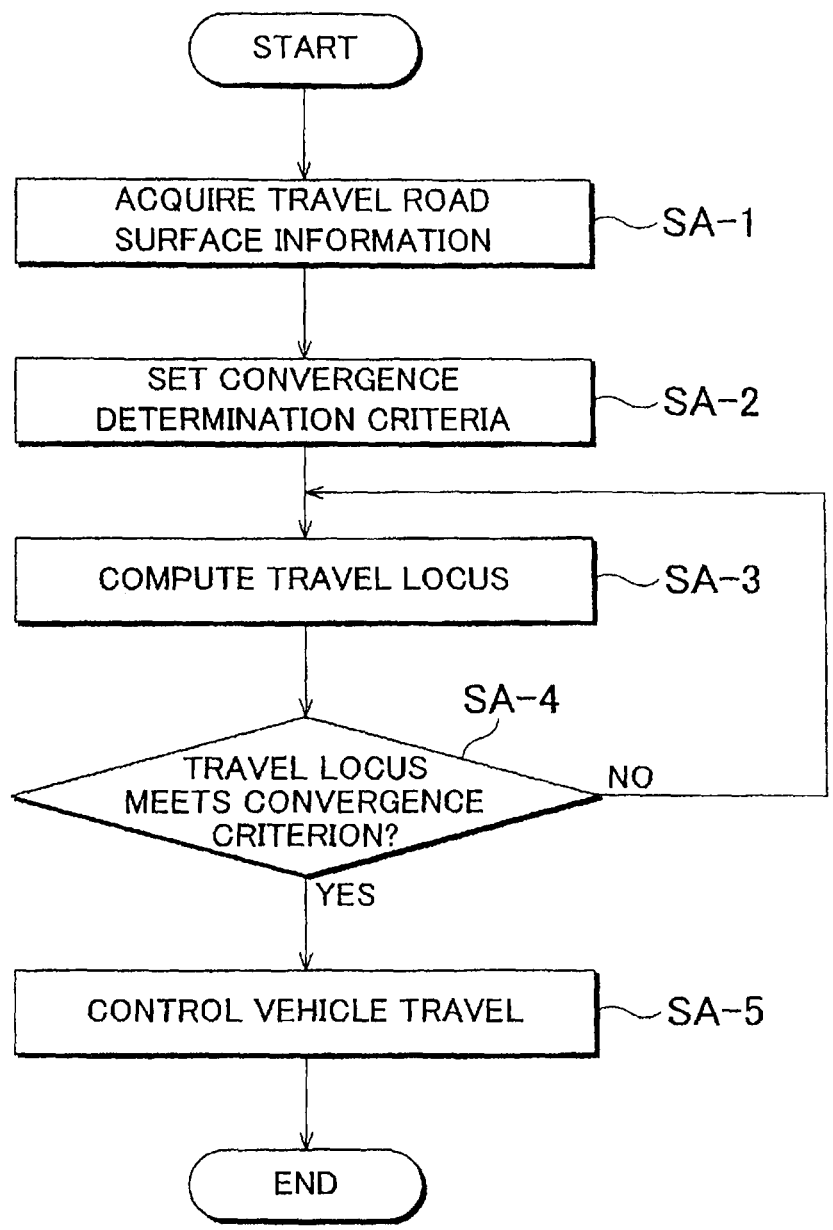
FIG. 2 is a flowchart showing an example of a travel locus computing process that is performed by the system according to the embodiment of the invention.
Figure 3:
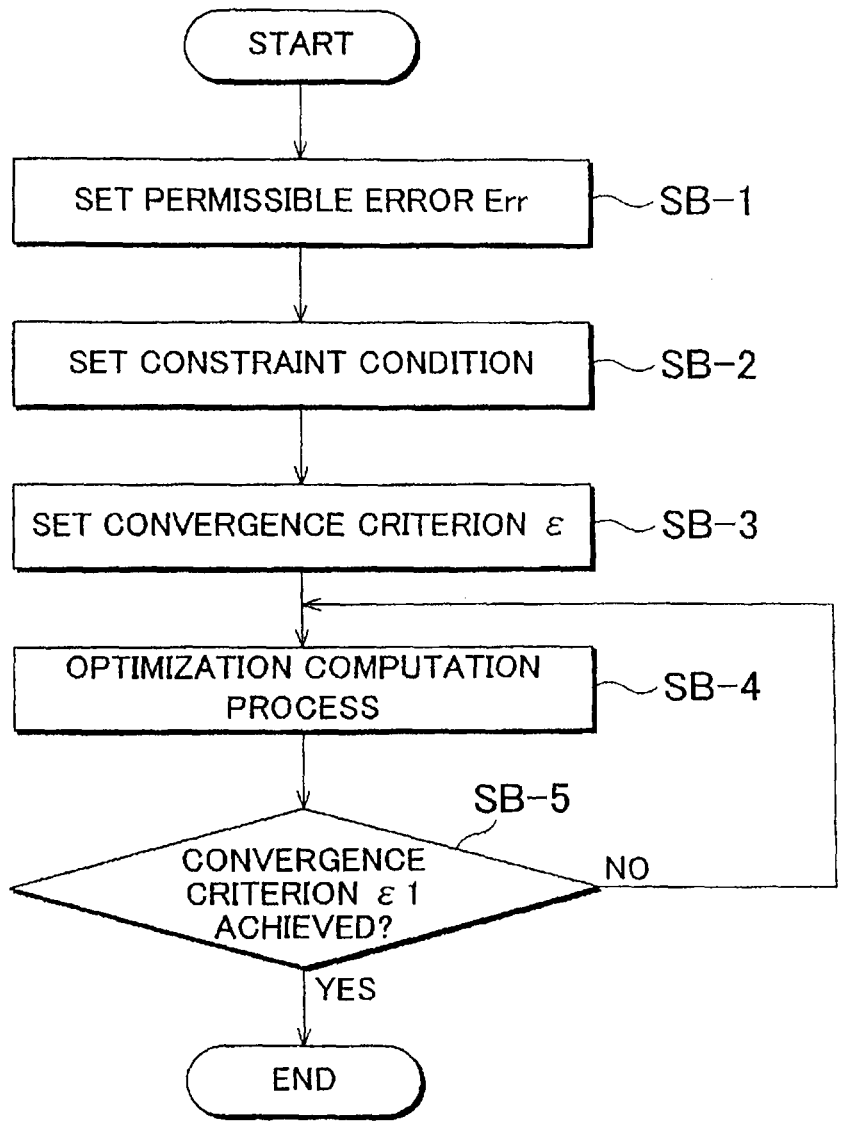
FIG. 3 is a flowchart showing an example of a travel locus computing process that includes a convergence criterion setting process in accordance with the embodiment of the invention.

As shown in FIG. 2, firstly, the convergence criterion setting portion 102a acquires travel road surface information (road width information, friction information, curve information, etc.) from the travel road surface information file 106a (step SA-1). Incidentally, the convergence criterion setting portion 102a may also acquire from the travel road surface information file 106a travel road surface information regarding a road on which the vehicle is to travel in the future, on the basis of the positional information about the host vehicle that is obtained from the GPS or the like.

Then, the convergence criterion setting portion 102a variably sets the convergence criterion for the evaluation function (e.g., the convergence criterion value $\epsilon 1$) according to the travel road surface information acquired (step SA-2).

Then, the travel locus computation portion 102b computes a travel locus by an optimization technique through the use of the evaluation function (step SA-3).

Then, if the convergence determination portion 102c determines that the value of the travel locus computed by the travel locus computation portion 102b does not meet the convergence criterion value $\epsilon 1$ for the evaluation function which is set by the convergence criterion setting portion 102a (NO in step SA-4), the process is returned to the process step SA-3.

On the other hand, if the convergence determination portion 102c determines that the value of the travel locus computed by the travel locus computation portion 102b meets the convergence criterion value $\epsilon 1$ for the evaluation function which is set by the convergence criterion setting portion 102a (YES in step SA-4), the travel locus computing process ends. Then, on the basis of the travel locus computed by the travel locus computing process, the vehicle travel control portion 102d controls the traveling of the vehicle (step SA-5). The description of an example of the travel locus computing process, having been sufficiently given above, is now ended.

(Convergence Criterion Setting Process)

Subsequently, an example in which, of the foregoing travel locus computing process, the convergence criterion setting process performed by the convergence criterion setting portion 102a is embodied, will be described with reference to FIG. 3 to FIG. 7.

Firstly, the convergence criterion setting portion 102a sets a permissible error Err (%) of the amount of protrusion of the vehicle relative to the road width in which the vehicle can travel, on the basis of the road width information stored in the travel road surface information file 106a (step SB-1). Herein, the permissible error (permissible amount of protrusion) Err is a numerical value that is determined from the safety margin to the vicinity of the center line, the road shoulder width, etc. Concretely, the convergence criterion setting portion 102a may calculate the permissible error on the basis of the following mathematical expression. In the mathematical expression, the safety margin Wm is a value that can be arbitrarily set, and may be changed according to, for example, the kind of the vehicle, the width of the road shoulder, the presence/absence of a center divider, etc.

$$(Wr-Wm)*\mathrm{Err}/100=Wm$$

In the expression, Err is a permissible error (%), and Wr is a actual road width, and Wm is a safety margin. Specifically, the permissible error can be represented by the following expression:

$$\mathrm{Err}(\%)=Wm*100/(Wr-Wm)$$

Then, on the basis of the expression W=Wr−Wm, the convergence criterion setting portion 102a sets a constraint condition regarding the road width for use in the following calculation, through the use of a travelable width W (step SB-2).

Figure 4:
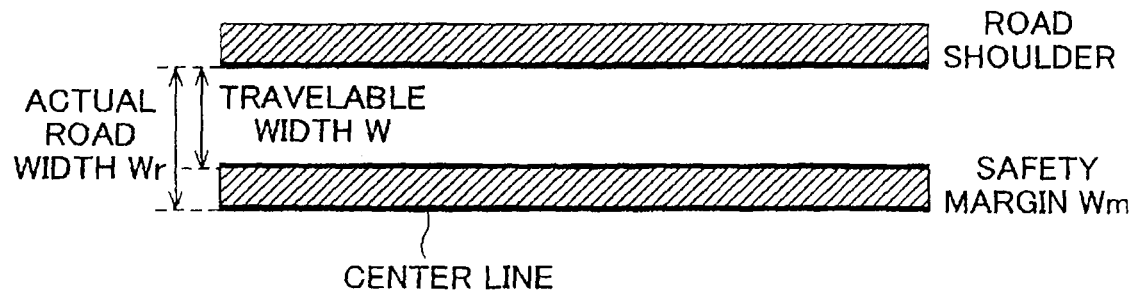
FIG. 4 is a diagram schematically showing a relation among the actual road width Wr, the safety margin Wm, the road shoulder width and the center line of a road in accordance with the embodiment of the invention.

As shown in FIG. 4, the actual road width Wr is a width of a road from the center line to the road shoulder. A value obtained by subtracting the safety margin Wm from the actual road width Wr is set as the travelable width W.

Then, the convergence criterion setting portion 102a sets a convergence criterion value $\epsilon 1$ such that the amount of protrusion relative to the road width (i.e., the travelable width W) remains within the permissible error Err (step SB-3). In this embodiment, for example, the amount of protrusion is represented by the area of a protrusion from the road width in an optimization computation performed by the travel locus computation portion 102b.

Figure 5:
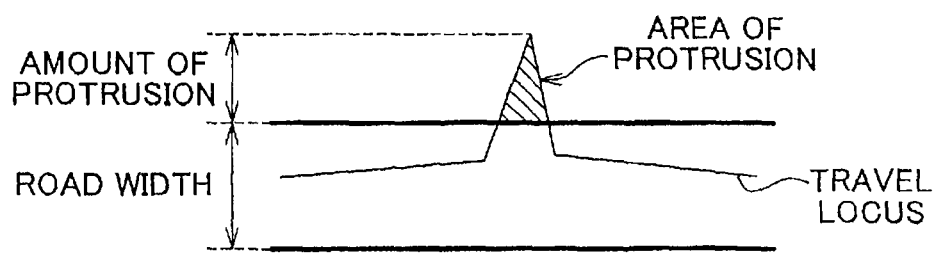
FIG. 5 is a diagram schematically showing an amount of protrusion and an area of protrusion relative to a road width in accordance with the embodiment of the invention.

As shown in FIG. 5, in the case where the travel locus computed by the travel locus computation portion 102b is protruded from the road width, the width of the protrusion is determined as the amount of protrusion, and the protruded area is handled as the area of protrusion in the optimization computation. Therefore, in this embodiment, the convergence criterion setting portion 102a calculates the area of protrusion in the case where the generated travel locus is protruded only at a single point after the optimization by the travel locus computation portion 102b is performed, that is, the permissible area. At this time, the permissible area calculated by the convergence criterion setting portion 102a is found by a logic (e.g., a function P2 below) that is the same as a calculation logic that is used in the optimization computation by the travel locus computation portion 102b. As an example, a calculation expression used by the convergence criterion setting portion 102a in the case where it is assumed that the travel locus computation portion 102b computes the area of protrusion using a Simpson method and performs non-dimensionalization of the coordinates in the process of the optimization computation.

$$P2=(4h/3)*(Err/100/Cx)^2$$

where h is the width between two adjacent points (i.e., the length of a section set in a Simpson method), and Cx is a non-dimensionalization factor.

For example, in the case where h=0.005 and Err=0.5 (the permissible error is 1.5 [cm] when the road width (travelable width W) is 3 [m]) and where Cx=250, the convergence criterion setting portion 102a finds $P2=2.7*10^{-12}$ by using the foregoing calculation expression. Then, the convergence criterion setting portion 102a sets the calculated value P2 as the convergence criterion value $\epsilon 1$, that is, $P2=\epsilon 1$. Therefore, it is possible to set a threshold value (convergence criterion value) that makes it possible to end the optimization computation with the amount of protrusion being 0.5% relative to the road width even in the worst case.

After the foregoing convergence criterion setting process ends, the travel locus computation portion 102b performs the optimization computation process for the travel locus (step SB-4) until it is determined by the convergence determination portion 102c that the set convergence criterion value $\epsilon 1$ has been achieved (as long as NO in step SB-5). If it is determined by the convergence determination portion 102e that the convergence criterion value $\epsilon 1$ has been achieved (YES in step SB-5), the travel locus computation portion 102b ends the process of optimization computation.

Incidentally, in the foregoing convergence criterion setting process, the permissible error Err of the amount of protrusion is set according to the road width information that is included in the travel road surface information stored in the travel road surface information file 106a. However, this does not limit the embodiment. The convergence criterion setting portion 102a may also set the permissible error Err according to the radius of curve R, the road surface friction coefficient μ, or the allowed calculation time $T_{calc}$, besides the road width Wr. For example, the convergence criterion setting portion 102a sets the permissible error Err by using the following function:

$$\text{Permissible error Err}=f(Wr,R,\mu,T_{calc})$$

Figure 6A:
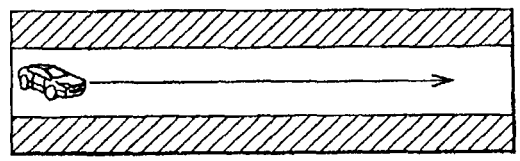
FIG. 6A is a diagram schematically showing an example of the setting of a permissible error Err in the case where the radius of curve is great, in accordance with the embodiment of the invention.
Figure 6B:
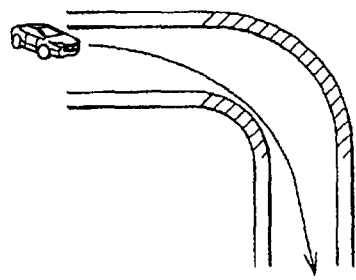
FIG. 6B is a diagram schematically showing an example of the setting of the permissible error Err in the case where the radius of curve is small, in accordance with the embodiment of the invention.

In the case where the permissible error Err is set according to the radius of curve R, the convergence criterion setting portion 102a may set the permissible error Err greater the greater the radius of curve R, and may set the permissible error Err smaller the smaller the radius of curve R. As shown in FIG. 6A, in the case where the road shape is linear and the radius of curve R is great, the convergence criterion setting portion 102a sets the permissible error Err great, so that the computation time can be reduced. On the other hand, in the case where the road shape is curved and the radius of curve R is small as shown in FIG. 6B, the convergence criterion setting portion 102a sets the permissible error Err small, so that an increased value of the road width can be used in computing a travel locus, and therefore a travel locus that is good in vehicle stability can be computed.

Figure 7A:
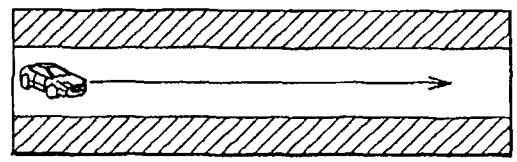
FIG. 7A is a diagram schematically showing an example of the setting of the permissible error Err in the case where the friction coefficient is great, in accordance with the embodiment of the invention.
Figure 7B:
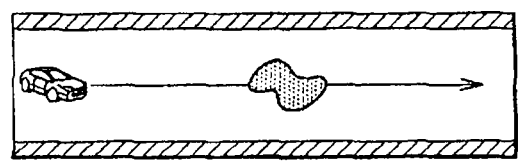
FIG. 7B is a diagram schematically showing an example of the setting of the permissible error Err in the case where the friction coefficient is small, in accordance with the embodiment of the invention.

In the case where the permissible error Err is set according to the friction coefficient μ of the road surface, the convergence criterion setting portion 102a may set the permissible error Err greater the greater the friction coefficient μ, and may set the permissible error Err smaller the smaller the friction coefficient μ. As shown in FIG. 7A, in the case where the friction coefficient μ is great as on a dry road surface, the convergence criterion setting portion 102a sets the permissible error Err great, so that the computation time can be reduced. On the other hand, in the case where the friction coefficient μ is small, such as the case where the road surface has a puddle and therefore is a wet surface as shown in FIG. 7B, the convergence criterion setting portion 102a sets the permissible error Err small, so that an increased value of the road width can be used in computing a travel locus and therefore a travel locus that is good in vehicle stability can be computed.

In the case where the permissible error Err is set according to the allowed calculation time $T_{calc}$, the convergence criterion setting portion 102a may set the permissible error Err greater the shorter the allowed calculation time $T_{calc}$, and may set the permissible error Err smaller the longer the allowed calculation time $T_{calc}$. In the case where the allowed calculation time $T_{calc}$ is short, it is necessary to quickly end the calculation. Therefore, in that case, the convergence criterion setting portion 102a sets the permissible error Err great, so that the computation time can be reduced. On the other hand, in the case where the allowed calculation time $T_{calc}$ is long, the convergence criterion setting portion 102a sets the permissible error Err small, so that a long allowed calculation time can be utilized to compute a travel locus that is good in vehicle stability.

The description of the system in the embodiment, having been sufficiently given above, is now ended.

3. Summary of the Embodiment, and Other Embodiments

According to the foregoing embodiment, the convergence criterion value $\epsilon 1$ for the evaluation function is variably set according to the travel road surface information stored in the travel road surface information file 106a, and a travel locus is computed by using the evaluation function so that the set convergence criterion value $\epsilon 1$ is satisfied. Due to this, the condition for determining the convergence of the evaluation function can be appropriately set, so that it is possible to perform a computation of the travel locus that achieves both reduced computation time and good vehicle stability.

According to this embodiment, the travel road surface information includes at least one of the road width information regarding the road width of the travel road surface, the friction information regarding the friction of the travel road surface, and the curve information regarding the curve of the travel road surface. Due to this, it is possible to appropriately set the condition for determining the convergence of the evaluation function while taking into account states of the travel road surface, such as the road width, the friction, the curve, etc., and therefore achieve both reduced computation time and good vehicle stability.

According to the embodiments, the convergence criterion value $\epsilon 1$ is set greater the greater the road width W included in the road width information. Due to this, in the case where the road width is relatively great, a computation in which reduction of the computation time is regarded as more important than improvement of the computation accuracy is performed. In the case where the road width is relatively small, a computation in which improvement of the computation accuracy is regarded as more important than reduction of the computation time is performed. Therefore, it is possible to perform a computation of a travel locus which achieves both reduced computation time and good vehicle stability.

According to the embodiments, the convergence criterion value $\epsilon 1$ is set greater the greater the friction coefficient μ included in the friction information. Due to this, in the case where the friction coefficient is relatively great, a computation in which reduction of the computation time is regarded as more important than improvement of the computation accuracy is performed. In the case where the friction coefficient is relatively small, a computation in which improvement of the computation accuracy is regarded as more important than reduction of the computation time is performed. Therefore, it is possible to perform a computation of a travel locus which achieves both reduced computation time and good vehicle stability.

According to the embodiments, the convergence criterion value $\epsilon 1$ is set greater the greater the radius of curve R included in the curve information. Due to this, in the case where the radius of curve is relatively great, a computation in which reduction of the computation time is regarded as more important than improvement of the computation accuracy is performed. In the case where the radius of curve is relatively small, a computation in which improvement of the computation accuracy is regarded as more important than reduction of the computation time is performed. Therefore, it is possible to perform a computation of a travel locus which achieves both reduced computation time and good vehicle stability.

According to the embodiments, the allowed calculation time $T_{calc}$ that elapses before the control of the vehicle starts is calculated on the basis of the travel road surface information stored in the travel road surface information file 106a, and the convergence criterion value $\epsilon 1$ is variably set according to the allowed calculation time $T_{calc}$. Due to this, it is possible to perform a computation of a travel locus in which vehicle stability is taken into account according to the allowed calculation time that is computed according to the travel road surface.

According to the embodiments, the convergence criterion value $\epsilon 1$ is set greater the longer the allowed calculation time $T_{calc}$. Due to this, in the case where the allowed calculation time is relatively long, a computation in which improvement of the computation accuracy is regarded as more important than reduction of the computation time is performed. In the case where the allowed calculation time is relatively short, a computation in which reduction of the computation time is regarded as more important than improvement of the computation accuracy is performed. Therefore, it is possible to perform a computation of a travel locus which achieves both reduced computation time and good vehicle stability.

Lastly, the vehicle control apparatus in accordance with the invention may be carried out in various embodiments, besides the foregoing embodiments, within the scope of the technical idea described in the appended claims. For example, of the processes described above in conjunction with the embodiments, all or at least one or a portion of the processes that have been described above as being automatically performed can be manually performed, or all or at least one or a portion of the processes that have been described above as being manually performed can be automatically performed by known methods. Besides, with regard to the processing procedures, the control procedures, the concrete names, information that includes registered data and parameters in the processes which are shown in this specification or the drawings can be arbitrarily changed unless otherwise mentioned. Besides, with regard to the vehicle ECU 100, the various component elopements shown in the drawings are merely given in terms of functional concept, and it is not altogether necessary to physically provide a construction as shown in the drawings. Besides, the concrete configurations of the disintegration and integration of the apparatus are not limited to what are shown in the drawings or in the specification. The entire apparatus or a portion thereof can be functionally or physically disintegrated or integrated in arbitrary units according to various loads or the like, or according to functional loads. Besides, although the foregoing embodiments are described in conjunction with an example case where the vehicle ECU 100 performs processes in a stand-alone configuration, it is also permissible to adopt a construction in which the vehicle ECU 100 performs information processes according to requests from an ECU that is constructed in a casing separate from the vehicle ECU 100, and the vehicle ECU 100 returns results of the processes to the ECU.

As can be understood from the foregoing description, the vehicle control apparatus according to the invention can be suitably carried out, particularly in the motor vehicle manufacturing industry, and is highly useful.

What is claimed is:

1. A vehicle control device comprising:
   circuitry that computes a future travel locus of a vehicle by using an evaluation function; and
   a travel road surface information memory that stores travel road surface information regarding a travel road surface on which the vehicle travels, wherein
   the circuitry variably sets a convergence criterion for the evaluation function according to the travel road surface information stored in the travel road surface information memory, the convergence criterion being related to a degree of priority of a computation time of the travel locus and a degree of priority of a computation accuracy of the travel locus, the convergence criterion being a function of an error, and the circuitry setting the error based on a road width of the travel road surface, radius of curve of the travel road surface, a friction coefficient of the travel road surface, and an allowed calculation time that elapses before control of the vehicle starts.

2. The vehicle control apparatus according to claim 1, wherein
   the circuitry determines whether the future travel locus satisfies the convergence criterion.

3. A vehicle control method performed by a vehicle control apparatus that includes processing circuitry and a memory, the vehicle control method comprising:
   computing, by the processing circuitry, a future travel locus of a vehicle by using an evaluation function;
   storing, in the memory, travel road surface information regarding a travel road surface on which the vehicle travels; and
   variably setting, by the processing circuitry, a convergence criterion for the evaluation function according to the travel road surface information stored, wherein:
   the travel road surface information includes travelable width information regarding a road,
   in computation of the travel locus, the computing computes an area of protrusion between a travelable width included in the travelable width information and a travel locus deviating from the travelable width by a Simpson method, and
   the evaluation function represents the area of protrusion, and is proportional to a length of one section of a plurality of sections that are divided in the Simpson method.

4. A vehicle control method performed by a vehicle control apparatus that includes processing circuitry and a memory, the vehicle control method comprising:
   computing, by the processing circuitry, a future travel locus of a vehicle by using an evaluation function;
   storing, in the memory, travel road surface information regarding a travel road surface on which the vehicle travels;
   variably setting, by the processing circuitry, a convergence criterion for the evaluation function according to the travel road surface information stored, the convergence criterion being related to a degree of priority of a computation time of the travel locus and a degree of priority of a computation accuracy of the travel locus;

computing, by the processing circuitry, an allowed calculation time that elapses before control of the vehicle starts, based on the travel road surface information stored by the storing in the memory, wherein:

the travel road surface information includes travelable width information regarding a road, and the evaluation function is a function that evaluates amount by which the travel locus is protruded from the travelable width included in the travelable width information, and is proportional to a permissible error that is a predetermined permissible amount of the amount by which the travel locus is protruded; and setting, by the processing circuitry, the permissible error greater, as the allowed calculation time becomes shorter.

5. A vehicle control method performed by a vehicle control apparatus that includes processing circuitry and a memory, the vehicle control method comprising:

computing, by the processing circuitry, a future travel locus of a vehicle by using an evaluation function;

storing, in the memory, travel road surface information regarding a travel road surface on which the vehicle travels; and variably setting, by the processing circuitry, a convergence criterion for the evaluation function according to the travel road surface information stored, the convergence criterion being related to a degree of priority of a computation time of the travel locus and a degree of priority of a computation accuracy of the travel locus, wherein the variably setting includes
  determining the degree of priority of the computation time of the travel locus to be lower in response to the convergence criterion being higher, and
  determining the degree of priority of the computation accuracy of the travel locus to be higher in response to the convergence criterion being lower.

6. A vehicle control apparatus comprising:

circuitry that computes a future travel locus of a vehicle by using an evaluation function; and a travel road surface information memory that stores travel road surface information regarding a travel road surface on which the vehicle travels, wherein:

the circuitry variably sets a convergence criterion for the evaluation function according to the travel road surface information stored in the travel road surface information memory, the convergence criterion being related to a degree of priority of a computation time of the travel locus and a degree of priority of a computation accuracy of the travel locus, and the circuitry computes an allowed calculation time that elapses before control of the vehicle starts, based on the travel road surface information stored in the travel road surface information memory, and variably sets the convergence criterion according to the allowed calculation time.

7. The vehicle control apparatus according to claim 6, wherein
the circuitry sets the convergence criterion greater, as the allowed calculation time becomes longer.

8. The vehicle control apparatus according to claim 6, wherein
in the control of the vehicle, motion of the vehicle is controlled.

9. The vehicle control apparatus according to claim 6, wherein
the control of the vehicle is performed based on the travel locus computed.

10. A vehicle control apparatus comprising:

circuitry that computes a future travel locus of a vehicle by using an evaluation function; and a travel road surface information memory that stores travel road surface information regarding a travel road surface on which the vehicle travels, wherein:

the circuitry variably sets a convergence criterion for the evaluation function according to the travel road surface information stored in the travel road surface information memory, the travel road surface information includes travelable width information regarding a road, in computation of the travel locus, an area of protrusion between a travelable width included in the travelable width information and a travel locus deviating from the travelable width is computed by a Simpson method, and the evaluation function represents the area of protrusion, and is proportional to a length of one section of a plurality of sections that are divided in the Simpson method.

11. A vehicle control apparatus comprising:

circuitry that computes a future travel locus of a vehicle by using an evaluation function; and a travel road surface information memory that stores travel road surface information regarding a travel road surface on which the vehicle travels, wherein the circuitry
  variably sets a convergence criterion for the evaluation function according to the travel road surface information stored in the travel road surface information memory, the convergence criterion being related to a degree of priority of a computation time of the travel locus and a degree of priority of a computation accuracy of the travel locus,
  determines the degree of priority of the computation time of the travel locus to be lower in response to the convergence criterion being higher, and
  determines the degree of priority of the computation accuracy of the travel locus to be higher in response to the convergence criterion being lower.

12. The vehicle control apparatus according to claim 11, wherein
the circuitry repeatedly computes the future travel locus, the circuitry performing a lower number of repetitions of computation of the future travel locus in response to the degree of priority of the computation time of the travel locus being lower, and performing a higher number of repetitions of computation of the future travel locus in response to the degree of priority of the computation accuracy of the travel locus being higher.

13. A vehicle control apparatus comprising:

circuitry that computes a future travel locus of a vehicle by using an evaluation function; and a travel road surface information memory that stores travel road surface information regarding a travel road surface on which the vehicle travels, wherein:

the circuitry variably sets a convergence criterion for the evaluation function according to the travel road surface information stored in the travel road surface information memory, the convergence criterion being related to a degree of priority of a computation time of the travel locus and a degree of priority of a computation accuracy of the travel locus, the circuitry computes an allowed calculation time that elapses before control of the vehicle starts, based on the travel road surface information stored in the travel road surface information storage portion memory, the travel road surface information includes travelable width information regarding a road, the evaluation function is a function that evaluates amount by which the travel locus is protruded from the travelable width included in the travelable width information, and is proportional to a permissible error that is a predetermined permissible amount of the amount by which the travel locus is protruded, and the permissible error is set greater, as the allowed calculation time becomes shorter.

14. A vehicle control method performed by a vehicle control apparatus that includes processing circuitry and a memory, the vehicle control method comprising:

computing, by the processing circuitry, a future travel locus of a vehicle by using an evaluation function;

storing, in the memory, travel road surface information regarding a travel road surface on which the vehicle travels;

variably setting, by the processing circuitry, a convergence criterion for the evaluation function according to the travel road surface information stored, the convergence criterion being related to a degree of priority of a computation time of the travel locus and a degree of priority of a computation accuracy of the travel locus, and the convergence criterion being a function of an error; and setting, by the processing circuitry, the error based on a road width of the travel road surface, radius of curve of the travel road surface, a friction coefficient of the travel road surface, and an allowed calculation time that elapses before control of the vehicle starts.

15. A vehicle control method performed by a vehicle control apparatus that includes processing circuitry and a memory, the vehicle control method comprising:

computing, by the processing circuitry, a future travel locus of a vehicle by using an evaluation function;

storing, in the memory, travel road surface information regarding a travel road surface on which the vehicle travels;

variably setting, by the processing circuitry, a convergence criterion for the evaluation function according to the travel road surface information stored, the convergence criterion being related to a degree of priority of a computation time of the travel locus and a degree of priority of a computation accuracy of the travel locus;

computing an allowed calculation time preceding start of control of motion of the vehicle based on the travel road surface information stored; and variably setting the convergence criterion according to the allowed calculation time.

16. The vehicle control method according to claim 15, wherein the convergence criterion is set greater, as the allowed calculation time becomes longer.

\* \* \* \* \*